(12) United States Patent
Miyamoto

(10) Patent No.: US 7,925,145 B2
(45) Date of Patent: Apr. 12, 2011

(54) IMAGE VIBRATION REDUCTION APPARATUS AND CAMERA EQUIPPED WITH SAME

(75) Inventor: Hidenori Miyamoto, Urayasu (JP)

(73) Assignee: Nikon Corporation, Tokyo (JP)

(*) Notice: Subject to any disclaimer, the term of this patent is extended or adjusted under 35 U.S.C. 154(b) by 527 days.

(21) Appl. No.: 11/353,027

(22) Filed: Feb. 14, 2006

(65) Prior Publication Data

US 2006/0204233 A1 Sep. 14, 2006

(30) Foreign Application Priority Data

Mar. 8, 2005 (JP) ................................. 2005-064118

(51) Int. Cl.
G03B 17/00 (2006.01)
(52) U.S. Cl. .......................................... 396/55; 396/52
(58) Field of Classification Search .................. 396/52, 396/55; 348/208.99, 208.4, 208.7, 208.11
See application file for complete search history.

(56) References Cited

U.S. PATENT DOCUMENTS

| | | | |
|---|---|---|---|
| 5,266,988 A | 11/1993 | Washisu | |
| 5,416,558 A | 5/1995 | Katayama et al. | |
| 5,854,946 A | 12/1998 | Imamura | |
| 5,864,722 A | 1/1999 | Aoki et al. | |
| 5,930,531 A | 7/1999 | Kitagawa | |
| 6,295,412 B1 | 9/2001 | Katano et al. | |
| 6,603,927 B2 * | 8/2003 | Enomoto | 396/55 |
| 2006/0285840 A1 * | 12/2006 | Takahashi | 396/55 |
| 2007/0257989 A1 | 11/2007 | Shirono | |

FOREIGN PATENT DOCUMENTS

| | | |
|---|---|---|
| JP | 2002-107782 | 4/2002 |
| JP | 2003-111449 | 4/2003 |
| JP | 2003-255422 | 9/2003 |

OTHER PUBLICATIONS

Hidenori Miyamoto et al., Patent Abstracts of Japan, "Camera Provided With Shake Correcting Function", Publication No. 07-281232 and Publication Date: Oct. 27, 1995.
Yuji Katano et al., Patent Abstracts of Japan, "Vibration Proof Camera", Publication No. 08-076165, Publication Date: Mar. 22, 1996.
Japanese Office Action drafted on Oct. 4, 2010 and mailed on Oct. 12, 2010 in corresponding Japanese Patent Application No. 2005-066418.

* cited by examiner

*Primary Examiner* — Rodney E Fuller
(74) *Attorney, Agent, or Firm* — Staas & Halsey LLP

(57) ABSTRACT

An image vibration reduction apparatus comprises a correction lens, a first moving member having a lens frame that holds the correction lens, a second moving member having an aperture portion in which the lens frame is slidably fitted, a first actuator that drives the first moving member, a second actuator that drives the second moving member, and a holding member that supports the first moving member and the second moving member. Driving direction of the first actuator and the second actuator is oriented in a first direction that is perpendicular to the optical axis of the correction lens, and a second direction in which the second actuator displaces the lens frame via the second moving member is perpendicular to the first direction.

23 Claims, 7 Drawing Sheets

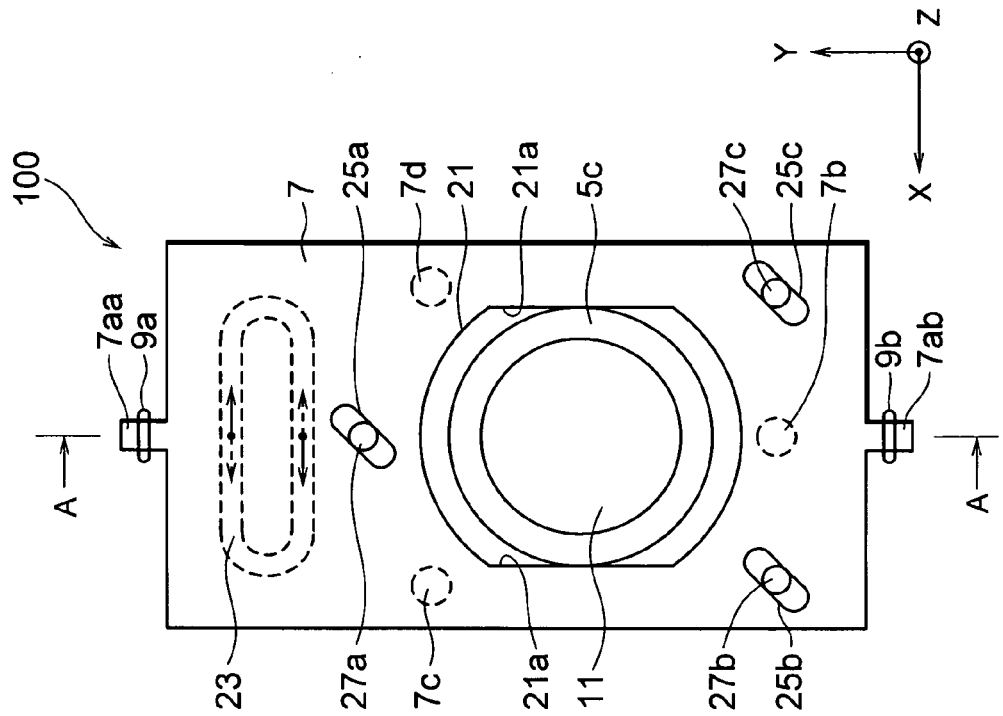
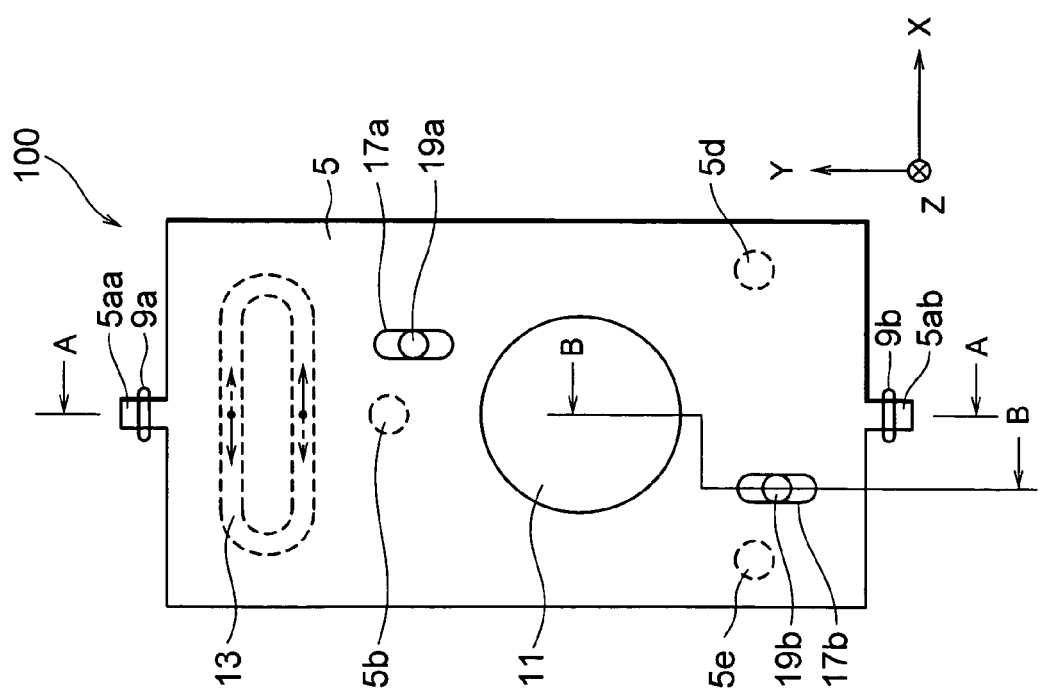

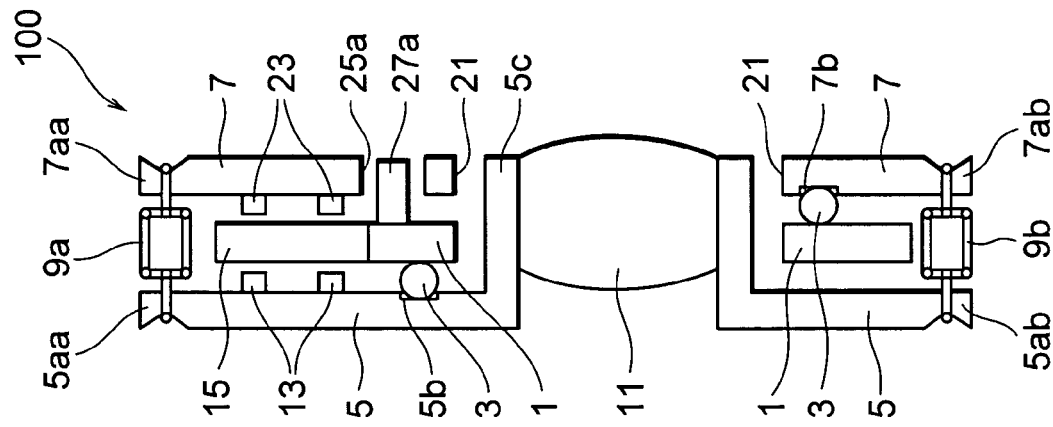

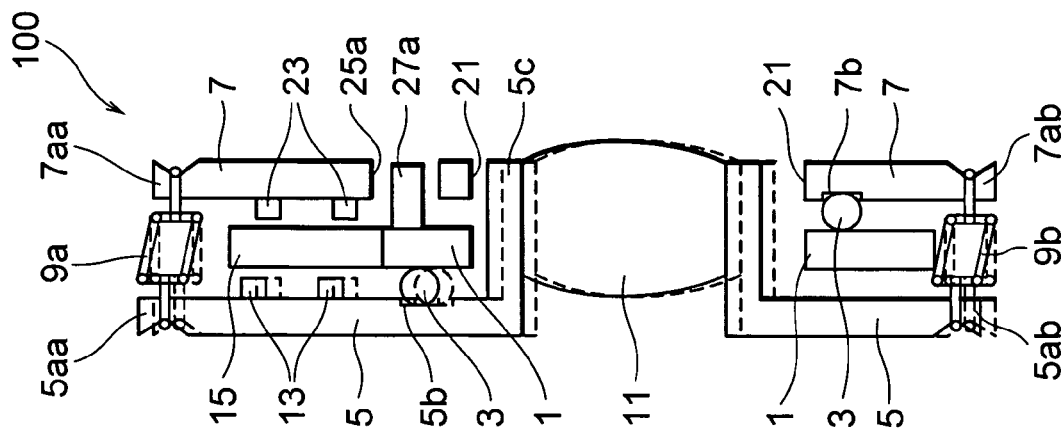
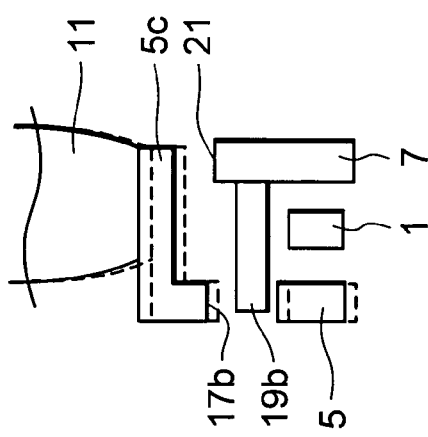

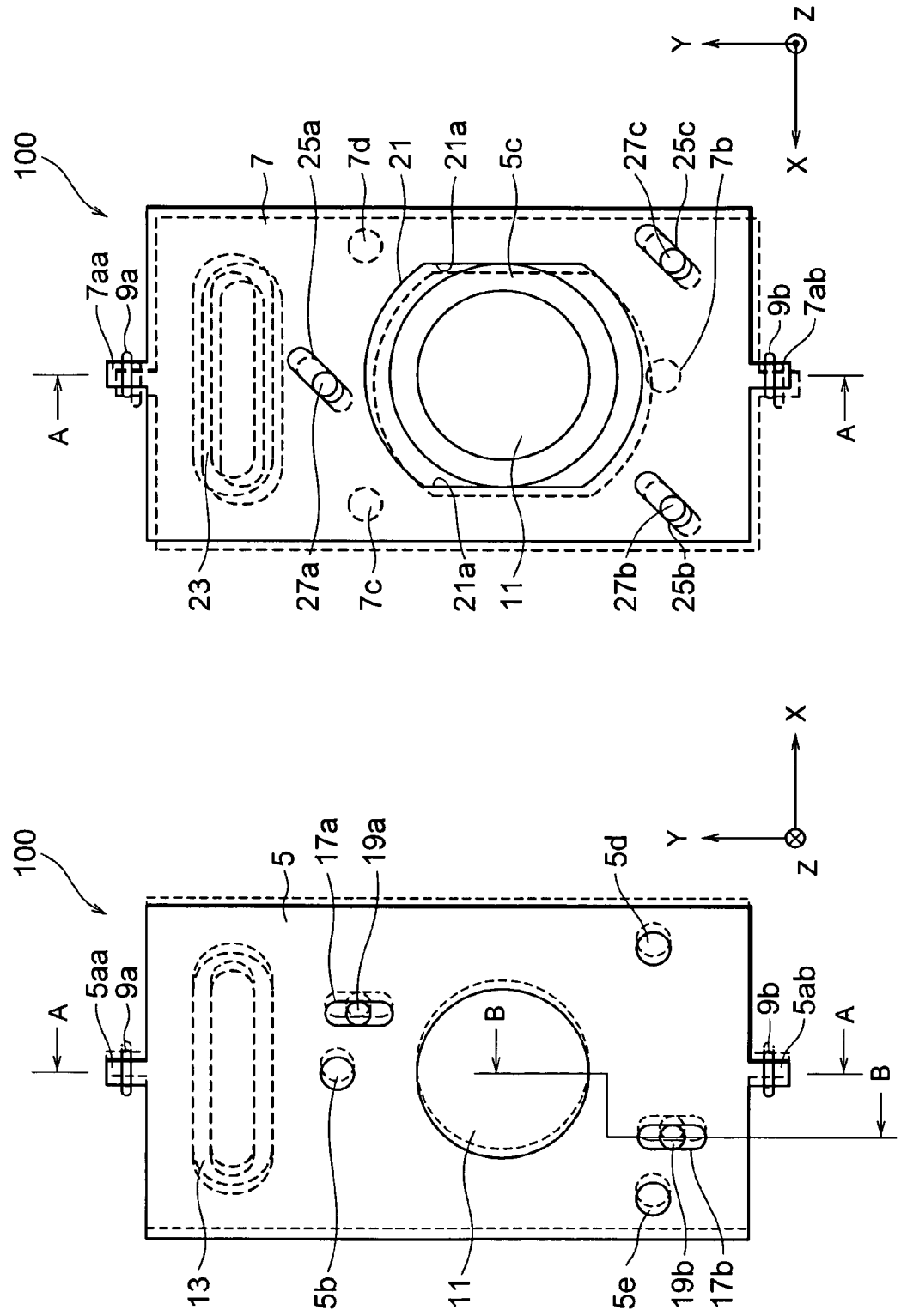

IMAGE VIBRATION REDUCTION APPARATUS AND CAMERA EQUIPPED WITH SAME

This application claims the benefit of Japanese Patent application No. 2005-064118 filed on Mar. 8, 2005 which is hereby incorporated by reference.

BACKGROUND OF THE INVENTION

1. Field of the Invention

The present invention relates to an image vibration reduction apparatus for reducing image vibration on an image plane that may be caused by camera shake. The present invention relates to also a camera that is equipped with the image vibration reduction apparatus.

2. Related Background Art

A conventional image vibration reduction apparatus for reducing image vibration on an image plane that may be caused by camera shake is equipped with an X axis actuator and a Y axis actuator on X and Y axes that are orthogonal to each other in a plane perpendicular to the optical axis of the photographing lens to make it possible to displace a correction lens in that plane (see for example, Japanese Patent Application Laid-Open No. 8-76165).

However, in such a conventional image vibration reduction apparatus, it is difficult to make the structure related to the correction lens compact, since the X axis actuator and the Y axis actuator for moving the correction lens are disposed on the respective axes.

SUMMARY OF THE INVENTION

The present invention has been made in view of the above problem and has as an object to provide an image vibration reduction apparatus in which the size of a structure related to a correction lens about one of the X and Y axis can be made small, and also to provide a camera equipped with the image vibration reduction apparatus.

To achieve the above object, according to the present invention, there is provided an image vibration reduction apparatus comprising a correction lens, a first moving member having a lens frame that holds said correction lens, a second moving member having an aperture portion in which said lens frame is slidably fitted, a first actuator that drives said first moving member, a second actuator that drives said second moving member, and a holding member that supports said first moving member and said second moving member, wherein driving direction of said first actuator and said second actuator is oriented in a first direction that is perpendicular to the optical axis of said correction lens, and a second direction in which said second actuator displaces said lens frame via said second moving member is perpendicular to said first direction.

In the image vibration reduction apparatus according to the present invention, it is preferred that said second moving member has a conversion member that converts displacement in said first direction caused by said second actuator into displacement of the lens frame in said second direction.

In the image vibration reduction apparatus according to the present invention, it is preferred that said conversion member comprises a guide groove formed on said second moving member inclined at an angle of approximately 45 degrees relative to said first direction and a guide pin fixed on said holding member and slidably fitted in said guide groove, and when said second moving member is displaced by said second actuator in said first direction, said second moving member be moved in a direction inclined relative to said first direction at an angle of approximately 45 degrees by said guide groove and said guide pin, whereby said lens frame slidably fitted in said opening is displaced in said second direction.

In the image vibration reduction apparatus according to the present invention, it is preferred that said first actuator and said second actuator be provided with a common magnet supported on said holding member therebetween.

In the image vibration reduction apparatus according to the present invention, it is preferred that said first moving member and said second moving member be provided with locating said holding member therebetween.

According to the present invention there is also provided a camera equipped with the image vibration reduction apparatus described in the foregoing.

According to the present invention, it is possible to provide an image vibration reduction apparatus in which it is possible to make the structure related to the correction lens compact with respect to either one of the X and Y axes.

BRIEF DESCRIPTION OF THE DRAWINGS

FIGS. 2A and 2B show an image vibration reduction apparatus according to the present invention, FIG. 2A showing a first moving member, and FIG. 2B showing a second moving member.

FIGS. 3A and 3B are cross sectional views of the image vibration reduction apparatus shown in FIGS. 2A and 2B. FIG. 3A is a cross sectional view taken along line A-A, and FIG. 3B is a cross sectional view taken along line B-B.

FIG. 4A shows a displaced state of the first moving member, and FIG. 4B shows a displaced state of the second moving member.

FIGS. 5A and 5B are cross sectional views of the image vibration reduction apparatus shown in FIGS. 4A and 4B. FIG. 5A is a cross sectional view taken along line A-A, and FIG. 5B is a cross sectional view taken along line B-B.

FIGS. 6A and 6B show the image vibration reduction apparatus shown in FIGS. 2A and 2B in a state in which the second moving member has been displaced in the +Y direction. FIG. 6A shows a displaced state of the first moving member, and FIG. 6B shows a displaced state of the second moving member.

FIG. 7A is a cross sectional view taken along line A-A, and FIG. 7B is a cross sectional view taken along line B-B.

DETAILED DESCRIPTION OF THE MOST PREFERRED EMBODIMENT

In the following, an embodiment of the present invention will be described with reference to the accompanying drawings.

Figure 1:
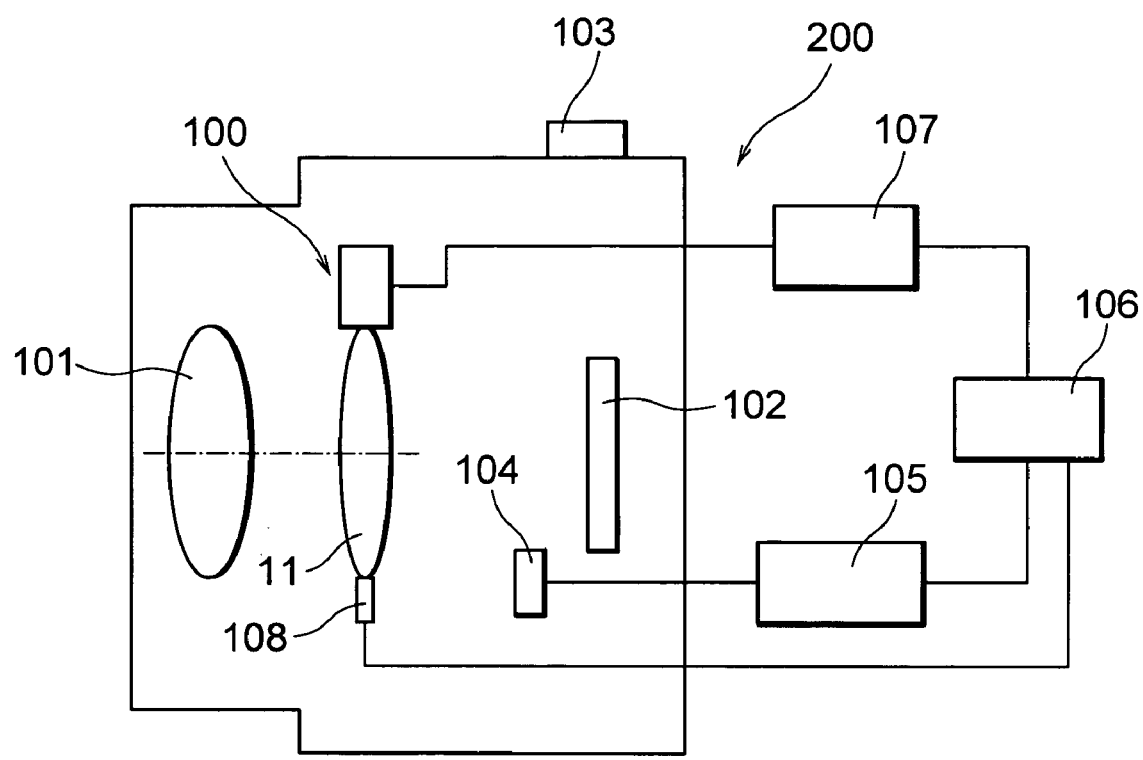
FIG. 1 schematically shows a camera equipped with an image vibration reduction apparatus according to an embodiment of the present invention.
Figure 4A:
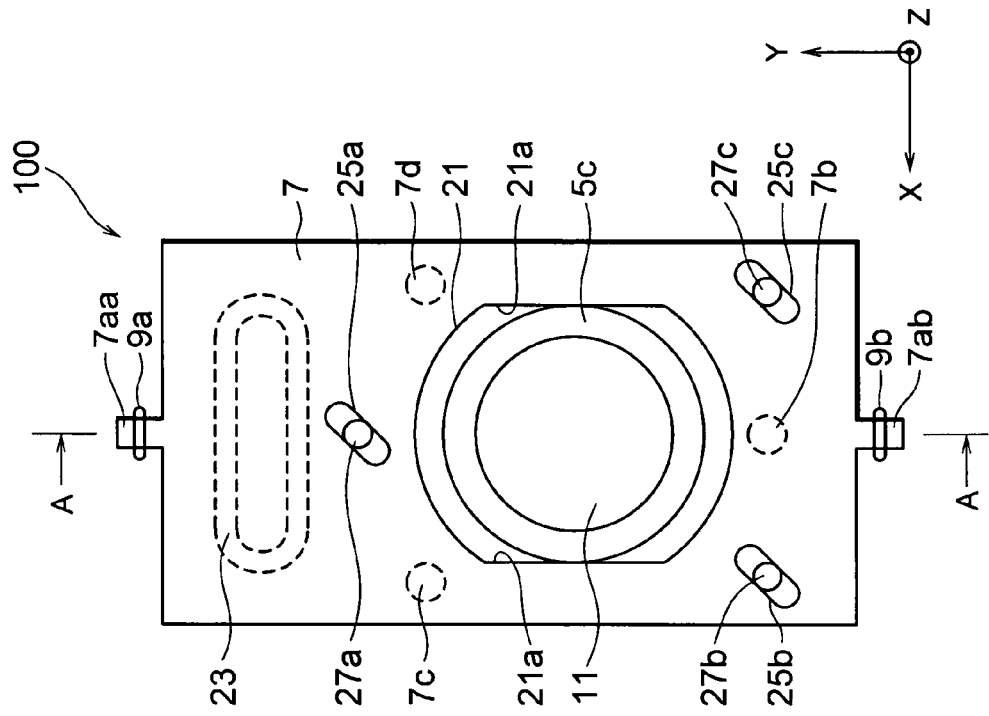
FIGS. 4A and 4B show the image vibration reduction apparatus shown in FIGS. 2A and 2B in a state in which the first moving member has been displaced in the +Y direction.
Figure 4B:
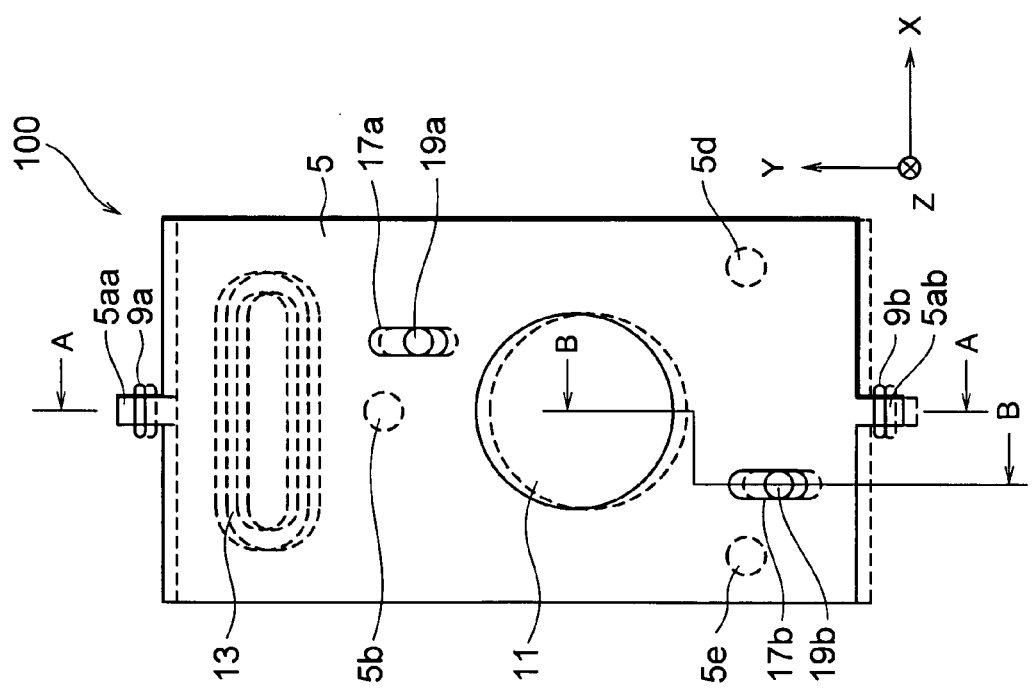
Figure 7A:
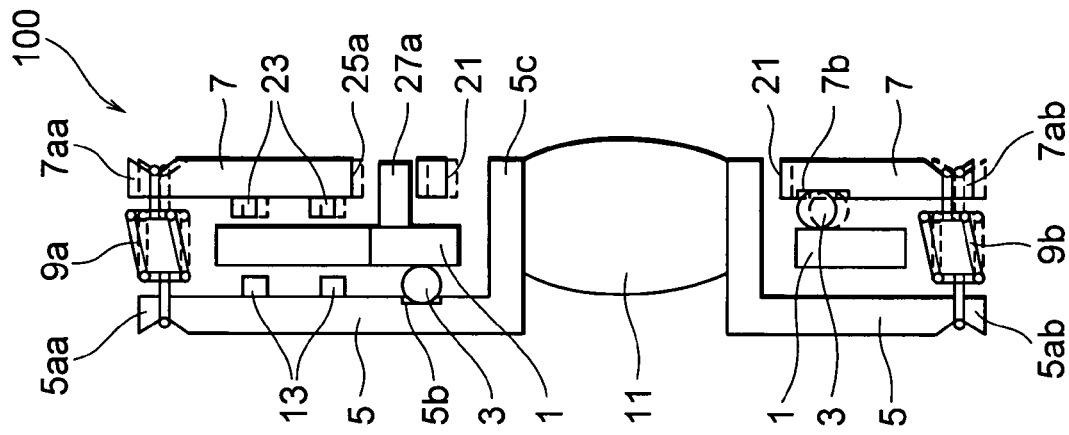
FIGS. 7A and 7B are cross sectional views of the image vibration reduction apparatus shown in FIGS. 6A and 6B.
Figure 7B:
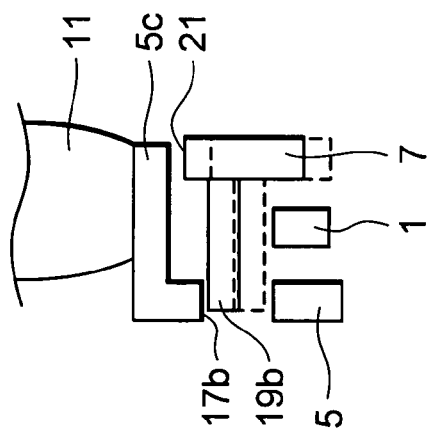

FIG. 1 schematically shows a camera equipped with an image vibration reduction apparatus according to an embodiment of the present invention. FIGS. 2A and 2B show an image vibration reduction apparatus according to the present invention. Specifically, FIG. 2A shows a first moving member, and FIG. 2B shows a second moving member. FIGS. 3A and 3B are cross sectional views of the image vibration reduction apparatus shown in FIGS. 2A and 2B. Specifically, FIG. 3A is a cross sectional view taken along line A-A, and FIG. 3B is a cross sectional view taken along line B-B. FIGS. 4A and 4B show the image vibration reduction apparatus shown in FIGS. 2A and 2B in a state in which the first moving member has been displaced in the +Y direction. Specifically, FIG. 4A shows a displaced state of the first moving member, and FIG. 4B shows a displaced state of the second moving member. FIGS. 5A and 5B are cross sectional views of the image vibration reduction apparatus shown in FIGS. 4A and 4B. Specifically, FIG. 5A is a cross sectional view taken along line A-A, and FIG. 5B is a cross sectional view taken along line B-B. FIGS. 6A and 6B show the image vibration reduction apparatus shown in FIGS. 2A and 2B in a state in which the second moving member has been displaced in the +Y direction. Specifically, FIG. 6A shows a displaced state of the first moving member, and FIG. 6B shows a displaced state of the second moving member. FIGS. 7A and 7B are cross sectional views of the image vibration reduction apparatus shown in FIGS. 6A and 6B. Specifically, FIG. 7A is a cross sectional view taken along line A-A, and FIG. 7B is a cross sectional view taken along line B-B.

Referring to FIG. 1, light from an object to be photographed (not shown) is collected by a photographing lens 101 and focused on an image pickup element 102 (such as a CCD) through a correction lens 11 that will be described later. When a shutter release button 103 is depressed halfway, image vibration detection means (for example, an angular velocity sensor or an angular acceleration sensor) 104 detects vibration of the camera 200 or image vibration caused by hand shake of the photographer and transmits a signal to a control apparatus 106 through a detection circuit 105. The control apparatus 106 computes, based on the signal from the detection circuit 105, an image vibration correction amount and causes the correction lens 11 to move in the X-Y plane that is perpendicular to the optical axis by means of a later-described image vibration reduction apparatus 100 via an image vibration correction circuit 107, thereby correcting or reducing image vibration on the CCD 102. The control apparatus 106 is adapted to detect the shift amount of the correction lens 11 by means of a position detection apparatus 108 provided in the image vibration reduction apparatus 100 to feed it back to the control apparatus 106. The camera 200 having the image vibration reduction apparatus 100 built therein has the above-described structure.

In the following, the image vibration reduction apparatus 100 according to the embodiment of the present invention will be described in detail. In the following description, X, Y and Z axes indicated in each drawing will be used.

Referring to FIGS. 2A, 2B and 3A and 3B, in the image vibration reduction apparatus 100 according to the embodiment of the present invention, a fixed member 1 fixed on the camera 200 is held between the first moving member 5 and the second moving member 7 with steel balls 3 for reducing friction being provided therebetween, and spring members 9a and 9b are set between upper and lower spring hooks 5aa, 5ab of the first moving member 5 and upper and lower spring hooks 7aa, 7ab of the second moving member 7 to bias them toward each other. Thus, the first moving member 5 and the second moving member 7 can move relative to the fixed member 1.

The first moving member 5 has a cylindrical lens frame 5c extending in the Z axis direction (i.e. the direction of the optical axis of the photographing lens 101), and the correction lens 11 is fixed on the lens frame 5c. On the surface of the upper portion of the first moving member 5 that faces the fixed member 1, a first coil 13 is provided. At a position on the fixed member 1 that is opposed to the first coil 13, a magnet member 15 is fixedly attached on the fixed member 1. The first coil 13 and the magnet member 15 constitute a first actuator. The first moving member 5 has guide grooves 17a and 17b for guiding movement of the first moving member 5 in the Y axis direction. Guide pins 19a and 19b fixed on the second moving member 7 are in engagement with the guide grooves 17a and 17b in such a way as to be slidable in the Y axis direction. On the surface of the first moving member 5 that faces the fixed member 1, recessed portions 5b, 5d and 5e for holding the steel balls 3 are provided.

The second moving member 7 has an opening 21 that allows sliding movement of the outer circumferential portion of the lens frame 5c in the Y axis direction, but restricts its movement in the X axis direction. At a position on the upper portion of the second moving member 7 that is opposed to the first coil 13, a second coil 23 is provided to face the magnet member 15. The second coil 23 and the magnet member 15 constitute a second actuator. The second moving member 7 has guide grooves 25a, 25b and 25c that are inclined relative to the Y axis direction at an angle of approximately 45 degrees. Guide pins 27a, 27b and 27c fixed on the fixed member 1 are in engagement with the guide grooves 25a, 25b and 25c in a slidable manner. On the surface of the second moving member 7 that faces the fixed member 1, recessed portions 7b, 7c and 7d for holding the steel balls 3 are provided.

The image vibration reduction apparatus 100 has the above-described structure.

The operation of the image vibration reduction apparatus 100 according to the embodiment of the present invention will be described with reference to FIGS. 4A, 4B to 7A, 7B.

First, how the correction lens 11 is displaced in the Y axis direction will be described. Referring to FIGS. 4 and 5, when a current flowing in a first direction (indicated by solid arrows in FIG. 2A) is supplied to the first coil 13 that constitutes the first actuator, a force in the +Y direction is generated in the first coil 13 by the Fleming's left hand rule in accordance with the direction of the current in the first coil 13 and the direction of the magnetic field generated by the magnet member 15 to displace the first moving member 5 in the +Y direction. The displacement amount and the displacement speed of the first moving member 5 can be adjusted by controlling the current supplied to the first coil 13 and the rate of change of that current. By displacing the first moving member 5, it is possible to displace the correction lens fixed on the lens frame 5c of the first moving member 5 in the +Y direction by a specific amount at a specific speed.

When a current flowing in a second direction (indicated by broken arrows in FIG. 2A) opposite to the first direction is supplied to the first coil 13, a force in the −Y direction is generated by the Fleming's left hand rule in a similar manner, so that the first moving member 5 is displaced in the −Y direction. The displacement amount and the displacement speed of the first moving member 5 can be adjusted by controlling the current supplied to the first coil 13 and the rate of change of that current as described above. By displacing the first moving member 5, it is possible to displace the correction lens fixed on the lens frame 5c of the first moving member 5 in the −Y direction by a specific amount at a specific speed.

As per the above, it is possible to displace the correction lens 11 in the ±Y directions by supplying positive or negative current to the first coil 13 of the first actuator. In that process, since the outer circumference of the lens frame 5c is only in contact with the end faces 21a, 21a, which are parallel to the Y axis direction, of the opening portion 21 of the second moving member 7, the second moving member 7 is not displaced with a movement of the first moving member 5 in the ±Y directions. In FIG. 4A, the broken lines show the first moving member 5 in its stationary state, and the solid lines show displacement in the +Y direction in a case where a current flowing in the first direction is supplied to the first coil 13.

Next, displacement of the correction lens 11 in the X axis direction will be described. Referring to FIGS. 6A, 6B and 7A, 7B when a current flowing in a first direction (indicated by solid arrows in FIG. 2B) is supplied to the second coil 23 that constitutes the second actuator, a force in the +Y direction is generated in the second coil 23 by the Fleming's left hand rule in accordance with the direction of the current in the second coil 23 and the direction of the magnetic field generated by the magnet member 15 to displace the second moving member 7 in the +Y direction. The displacement amount and the displacement speed of the second moving member 7 can be adjusted by controlling the current supplied to the second coil 23 and the rate of change of that current as described in the description of displacement in the Y axis direction.

As shown in FIG. 6B, movement of the second moving member 7 in the +Y direction is restricted by the guide grooves 25a, 25b and 25c inclined relative to the Y axis at angle of approximately 45 degrees and the guide pins 27a, 27b and 27c engaging the guide grooves 25a, 25b and 25c. Thus, the second moving member 7 moves upwardly at an angle of approximately 45 degrees relative to the Y axis along the guide grooves 25a, 25b and 25c. This oblique movement at an angle of 45 degrees can be decomposed into movement in the X axis direction and movement in the Y axis direction.

The movement of the second moving member 7 in the X axis direction (in this case, in the −X direction) is transmitted to the guide grooves 17a and 17b through the guide pins 19a and 19b to displace the first moving member 5 in the −X direction, whereby the lens frame 5c is displaced in the −X direction. Simultaneously, the movement of the second moving member 7 in the −X direction is transmitted to the lens frame 5c by the end faces 21a, 21a of the opening 21 that are parallel to the Y axis to displace the lens frame 5c in the −X direction. Consequently, the correction lens 11 is displaced in the −X direction by a specific amount at a specific speed.

On the other hand, movement of the second moving member 7 in the Y axis direction (in this case, in the +Y direction) only causes the guide pins 19a and 19b to move in the +Y direction along the guide grooves 17a and 17b extending along the Y axis direction, which does not cause any displacement of the first moving member 5. Similarly the movement of the second moving member 7 in the +Y direction only causes the end faces 21a, 21a of the opening 21 that are parallel to the Y axis to move in the +Y direction while in contact with the lens frame 5c, which does not cause any displacement of the lens frame 5c.

As described above, displacement in the +Y direction caused by the second actuator is converted by the guide grooves 25a, 25b and 25c and the guide pins 27a, 27b and 27c into displacement in the −X direction thereby displacing the correction lens 11 in the −X direction via the first moving member 5 and the second moving member 7.

When a current flowing in the second direction that is opposite to the first direction (indicated by broken arrows in FIG. 2B) is supplied to the second coil 23, a force in the −Y direction is generated by the Fleming's left hand rule in a similar manner to displace the second moving member 7 in the −Y direction. The displacement amount and the displacement speed of the second moving member 7 can be adjusted by controlling the current supplied to the second coil 23 and the rate of change of that current as described above.

Displacement of the second moving member 7 in the −Y direction is restricted by the guide grooves 25a, 25b and 25c inclined relative to the Y axis at an angle of approximately 45 degrees and the guide pins 27a, 27b and 27c engaging the guide grooves 25a, 25b and 25c. Thus, the second moving member 7 moves downwardly at an angle of approximately 45 degrees relative to the Y axis along the guide grooves 25a, 25b and 25c. This oblique movement at an angle of 45 degrees can be decomposed into movement in the X axis direction and movement in the Y axis direction.

The movement of the second moving member 7 in the X direction (in this case, in the +X direction) is transmitted by the guide pins 19a and 19b to the guide grooves 17a and 17b to displace the first moving member 5 in the +X direction, whereby the lens frame 5c moves in the +X direction. Simultaneously, the movement of the second moving member 7 in the +X direction is transmitted by the end faces 21a, 21a of the opening 21 that are parallel to the Y axis to the lens frame 5c to displace it in the +X direction. Consequently, the correction lens 11 is displaced in the +X direction by a specific amount at a specific speed.

On the other hand, movement of the second moving member 7 in the Y axis direction (in this case, in the −Y direction) only causes the guide pins 19a and 19b to move in the −Y direction along the guide grooves 17a and 17b formed along the Y axis direction, which does not cause any displacement of the first moving member 5. Similarly the movement of the second moving member 7 in the −Y direction only causes the end faces 21a, 21a of the opening 21 that are parallel to the Y axis to move in the +Y direction while in contact with the lens frame 5c, which does not cause any displacement of the lens frame 5c.

As described above, displacement in the −Y direction caused by the second actuator is converted by the guide grooves 25a, 25b and 25c and the guide pins 27a, 27b and 27c into displacement in the +X direction thereby displacing the correction lens 11 in the +X direction via the first moving member 5 and the second moving member 7.

As per the above, it is possible to displace the correction lens 11 in the ±X directions by supplying positive or negative current to the second coil 23 of the second actuator.

According to the image vibration reduction apparatus 100 of the embodiment of the present invention, in spite that the first actuator and the second actuator are provided at the same position, for example, on the Y axis, and displacement caused by these actuators is limited to the BY directions, it is possible to displace the correction lens 11 in desired directions in the X-Y plane. Thus, correction or reduction of image vibration on an image plane can be achieved. Conventionally, it has been difficult to make image vibration reduction apparatus compact since it has been necessary to dispose actuators at positions on both the X axis and the Y axis. In contrast, in the above-described image vibration reduction apparatus, it is possible to dispose both the actuators at the same position on one of the X or Y axis, and it is possible to make the structure related to the correction lens compact with respect to either one of the X and Y axes.

It should be understood that the above described embodiment is merely an example. The present invention is not limited to the above-described structure or mode, but various modifications and changes can be made thereon within the scope of the invention.

What is claimed is:

1. An image vibration reduction apparatus comprising:
   a correction lens;
   a first moving member having a lens frame that holds the correction lens and extends along an optical axis of the correction lens;
   a second moving member having an aperture portion in which the lens frame extending along the optical axis is slidably fitted;
   a first actuator that drives the first moving member;
   a second actuator that drives the second moving member; and
   a holding member that supports the first moving member and the second moving member,
   wherein driving direction of the first actuator and the second actuator is oriented in a first direction that is perpendicular to the optical axis of the correction lens, and a second direction in which the second actuator displaces the lens frame via the second moving member is perpendicular to the first; and
   the second moving member has a conversion member which converts a driving force in the first direction generated by the second actuator into a force displacing the lens frame in the second direction.

2. An image vibration reduction apparatus according to claim 1, wherein the first actuator and the second actuator are formed with a common magnet supported on the holding member therebetween.

3. An image vibration reduction apparatus according to claim 1, wherein
   the conversion member comprises a guide groove formed on the second moving member inclined at an angle of approximately 45 degrees relative to the first direction and a guide pin fixed on the holding member and slidably fitted in the guide groove, and
   when the second moving member is displaced by the second actuator in the first direction, the second moving member is moved in a direction inclined relative to the first direction at an angle of approximately 45 degrees by guide groove and the guide pin, and the lens frame slidably fitted in the opening portion is displaced in the second direction.

4. An image vibration reduction apparatus according to claim 3, wherein the first actuator and the second actuator are formed with a common magnet supported on the holding member therebetween.

5. A camera being provided with an image vibration reduction apparatus which comprises:
   a correction lens;
   a first moving member having a lens frame that holds the correction lens and extends along an optical axis of the correction lens;
   a second moving member having an aperture portion in which the lens frame extending along the optical axis is slidably fitted;
   a first actuator that drives the first moving member;
   a second actuator that drives the second moving member; and
   a holding member that supports the first moving member and the second moving member,
   wherein driving direction of the first actuator and the second actuator is oriented in a first direction that is perpendicular to the optical axis of the correction lens, and a second direction in which the second actuator displaces the lens frame via the second moving member is perpendicular to the first direction; and
   the second moving member has a conversion member which converts a driving force in the first direction generated by the second actuator into a force displacing the lens frame in the second direction.

6. A camera according to claim 5, wherein the first actuator and the second actuator are formed with a common magnet supported on the holding member therebetween.

7. An image vibration reduction apparatus, comprising:
   a correction lens;
   a first moving member that holds the correction lens and moves the correction lens in a first direction that is perpendicular to the optical axis of the correction lens;
   a second moving member that moves the correction lens in an opening of the first moving member, in a second direction that is perpendicular to the first direction;
   a first actuator that drives the first moving member; and
   a second actuator that is partially common to the first actuator and drives the second moving member.

8. An image vibration reduction apparatus according to claim 7, wherein the first actuator and the second actuator are magnetic actuators which include a common magnet.

9. An image vibration reduction apparatus according to claim 8, wherein the first moving member is formed with an opening elongated in the first direction,
   the second moving member has a guide pin slidably fitted in the elongated opening, and
   the movement of the second moving member in the second direction is transmitted by engagement of the guide pin with the opening to displace the first moving member in the second direction, thereby moving the correction lens in the second direction.

10. An image vibration reduction apparatus according to claim 7, wherein the second moving member moves the correction lens in an opening of the first moving member in the second direction that is perpendicular to the first direction.

11. An image vibration reduction apparatus according to claim 7, wherein the first moving member is formed with an opening elongated in the first direction,
    the second moving member has a guide pin slidably fitted in the elongated opening, and
    the movement of the second moving member in the second direction is transmitted by engagement of the guide pin with the opening to displace the first moving member in the second direction, thereby moving the correction lens in the second direction.

12. An image vibration reduction apparatus, comprising:
    a correction lens;
    a first moving member that holds the correction lens and moves the correction lens in a first direction that is perpendicular to the optical axis of the correction lens;
    a second moving member that moves the correction lens in an opening of the first moving member, in a second direction that is perpendicular to the first direction;
    a first actuator that moves the first moving member; and
    a second actuator that is partially common to the first actuator and moves the second moving member,
    wherein the second moving member overlaps at least partially the first moving member when viewed in the optical axial direction.

13. An image vibration reduction apparatus according to claim 12, wherein the first actuator and the second actuator are magnetic actuators which include a common magnet.

14. An image vibration reduction apparatus according to claim 12, wherein the first actuator applies a force in the first direction to the first moving member, and the second actuator applies a force in the first direction to the second moving member; and further comprising:

a conversion member that converts the force in the first direction applied by the second actuator in order to move the second moving member in the second direction.

15. An image vibration reduction apparatus, comprising:
a correction lens;
a first moving member that holds the correction lens and moves the correction lens in a first direction that is perpendicular to the optical axis of the correction lens;
a second moving member that moves the correction lens in an opening of the first moving member, in a second direction that is perpendicular to the first direction;
a first actuator that applies a force in the first direction to the first moving member;
a second actuator that applies a force in the first direction to the second moving member; and
a conversion member that converts the force in the first direction applied by the second actuator in order to move the first moving member in the second direction.

16. An image vibration reduction apparatus according to claim 15, further comprising:
a connecting member that connects the first moving member and the second moving member;
a holding member that supports the first moving member and the second moving member;
the conversion member comprising a guide groove formed on the second moving member inclined at an angle of approximately 45 degrees relative to the first direction, a guide pin fixed on the holding member and slidably fitted in the guide groove, and moving the second moving member in the first direction and in the second direction when the force in the first direction is applied to the second moving member by the second actuator, and the connection member that moves the first moving member in the same direction as the second moving member.

17. An image vibration reduction apparatus comprising:
a correction lens;
a first moving member to support the correction lens and to move the correction lens in a first direction that is perpendicular to the optical axis of the correction lens;
a second moving member that overlaps partially the first moving member when viewed in the direction of the optical axis and moving the correction lens in a second direction that is perpendicular to the optical axis of the correction lens and the first direction; and
a conversion member that converts a force in the first direction in order to move the first moving member in the second direction.

18. An image vibration reduction apparatus according to claim 17, further comprising:
a first actuator that moves the first moving member; and
a second actuator that is partially common to the first actuator and moves the second moving member.

19. A camera being equipped with an image vibration reduction apparatus which comprises:
a correction lens;
a first moving member that supports the correction lens and moves the correction lens in a first direction that is perpendicular to the optical axis of the correction lens;
a second moving member that moves the correction lens in a second direction that is perpendicular to the optical axis of the correction lens and the first direction through the first moving member; and
a conversion member that converts a force in the first direction in order to move the first moving member in the second direction.

20. A camera being according to claim 19, wherein the vibration reduction apparatus further comprises:
a first actuator that applies a first force in the first direction to the first moving member; and
a second actuator that applies the force in the first direction converted by the conversion member, to the second moving member.

21. A camera being equipped with an image vibration reduction apparatus which comprises:
a correction lens;
a first moving member to support the correction lens and to move the correction lens in a first direction that is perpendicular to the optical axis of the correction lens; and
a second moving member having an opening substantially centered on the optical axis, to allow light emerging from the correction lens to propagate and to move the correction lens in a second direction that is perpendicular to the optical axis of the correction lens and the first direction; and
a conversion member to convert a force in the first direction in order to move the first moving member in the second direction.

22. An image vibration reduction apparatus, comprising:
a correction lens;
a moving member having a lens frame that holds the correction lens;
a first actuator that moves the moving member in a first direction that is perpendicular to the optical axis of the correction lens;
a second actuator that moves the moving member in a second direction that is perpendicular to the first direction;
a magnet that is common to the first actuator and the second actuator and located therebetween; and
a holding member that supports the magnet.

23. A camera being equipped with a vibration reduction apparatus which comprises:
a correction lens;
a moving member having a lens frame that supports the correction lens;
a first actuator that moves the moving member in a first direction that is perpendicular to the optical axis of the correction lens;
a second actuator that moves the moving member in a second direction that is perpendicular to the first direction;
a magnet that is common to the first actuator and the second actuator and located therebetween; and
a holding member that supports the magnet.

* * * * *

UNITED STATES PATENT AND TRADEMARK OFFICE
CERTIFICATE OF CORRECTION

PATENT NO. : 7,925,145 B2
APPLICATION NO. : 11/353027
DATED : April 12, 2011
INVENTOR(S) : Hidenori Miyamoto It is certified that error appears in the above-identified patent and that said Letters Patent is hereby corrected as shown below:

Column 7, Line 21, in claim 1, delete "first;" and insert -- first direction; --, therefor.

Column 7, Line 40, in claim 3, after "by" insert -- the --.

Signed and Sealed this
Thirty-first Day of January, 2012

David J. Kappos
*Director of the United States Patent and Trademark Office*